United States Patent Office 2,837,425
Patented June 3, 1958

2,837,425

THERMO-SETTING METAL ALLOYS AND PRODUCTION THEREOF

Milton B. Vordahl, Beaver, Pa., assignor to Rem-Cru Titanium, Inc., Midland, Pa., a corporation of Pennsylvania No Drawing. Application March 26, 1954
Serial No. 419,079

7 Claims. (Cl. 75—175.5)

This invention pertains to a process of producing alloys comprising one or more relatively high melting metals or alloys and one or more relatively low melting metals or alloys.

A feature of the invention resides in the fact that the materials to be alloyed may be pressed, extruded or otherwise shaped during an initial stage of the process into any desired intricate configuration and in precise dimensions at extremely low pressures and temperatures.

The invention is particularly applicable to the production of alloys comprising one or more relatively high melting metals which are highly reactive chemically, such as titanium, zirconium and alloys of each, and one or more relatively low melting and less reactive metals, such as aluminum, tin, antimony, lead, bismuth, indium, etc., and low melting alloys thereof.

The conventional procedure for producing alloys of chemically reactive metals like titanium and zirconium with other metals, is to arc melt the constituents in a cold mold or water-cooled crucible in an inert atmosphere of argon or the like. An ingot is gradually built up in this way which often must be comminuted and remelted in order to obtain a homogeneous alloy. But in any event the resulting ingot must be forged or rolled to a desired final shape at temperatures on the order of 800–1000° C. and at high forging or rolling pressures. Only relatively simple semifinished shapes can thus be imparted, such as rough forgings or rolled bar or sheet stock. The melting points of such alloys are in general so high that they cannot be rendered molten and cast into intricate shapes to precise dimensions. Also the chemical reactivity of such alloys is so great when molten that they react with, and are contaminated by, most mold materials. Hence, for converting such alloys as thus produced, into intricate shapes in precise dimensions, extensive milling or other machining operations must be employed.

Now in accordance with the present invention, it is proposed to eliminate these difficulties by producing such alloys in any desired configuration as follows: A relatively high melting metal, such for example as titanium, melting at about 1800° C., is admixed in the form of a finely comminuted powder, with a powdered or comminuted admixture of a relatively low melting metal, such for example as tin, the melting point of which is 232° C. The admixture is heated slightly above the melting point of the tin, for example at about 250–300° C., until a relatively fluid paste is obtained consisting of the unmelted titanium particles dispersed throughout the more or less fluid or plastic tin. Interdiffusion as between the tin and the titanium particles is very slow at this temperature so that the paste will remain quite stable at this temperature for extended periods.

The paste while still at this temperature is now pressed or extruded into a desired shape as by the use of a mold, die orifice or the like. Since the paste can have imparted thereto any desired degree of fluidity in accordance with the proportioning of constituents and by appropriate minor adjustments of temperature, its properties during pressing or extrusion are those of a fluid in that pressure applied to any portion is equally transmitted and applied in all directions. In consequence, the paste will be forced into all cavities of the most intricate mold and in precise conformity with all dimensions thereof.

As thus shaped, the paste may now be held at the temperature of pressing until complete interdiffusion occurs between the constituents, thus to convert the same into a substantially homogeneous alloy having properties and microstructure corresponding to those obtained by melt casting the same starting constituents in a cold mold furnace as aforesaid. Preferably, however, the temperature is raised considerably following the shaping in order to expedite interdiffusion and solidification of the shaped alloy thus formed. Ordinarily the interdiffusion and solidification is effected in about 1 to 10 hours by raising the temperature to about 1200–1700° F.

The following are illustrative examples of the production of shaped products in accordance with the above:

*Example 1.*—An admixture of titanium powder and tin powder or chips, in desired proportions, for example, 80% by weight of titanium and 20% by weight of tin, is initially heated just above the melting point, 232° C., of the tin, for example, at a temperature of about 250–300° C., until a plastic or fluid paste is obtained. The product is thereupon shaped as desired while still maintained at this temperature. After shaping, it is heated at about 1200–1700° F. for a period of about 1 to 10 hours, until the titanium and tin have interdiffused into a solid, high strength alloy of substantially homogeneous structure.

*Example 2.*—A shaped alloy of titanium and aluminum is produced as follows: An admixture of, for example, 92% titanium and 8% aluminum powders is heated just above the melting point, 660° C. of the aluminum, for example, to about 700° C., until a paste is obtained. This paste is shaped while maintained at the temperature aforesaid into a desired shape as by pressing or extruding into a mold, etc. The so shaped product is then held at temperature or heated to a higher temperature, as in Example 1, until a solid, high strength alloy, shaped as aforesaid, results.

*Example 3.*—An admixture consisting of titanium powder and an alloy in powder or chip form analyzing 50% bismuth, 17.3% tin and 25.2% indium, is heated just above the melting point of the alloy, namely, to about 100° C., and shaped as aforesaid. This particular alloy is an eutectic having a melting point of 79° C. After heating and shaping at low temperature as aforesaid, the shaped product is heated at about 1200 to 2000° F. for about 1 to 10 hours to convert the composition into a high strength Ti-Bi-Sn-In alloy.

*Example 4.*—A shaped alloy of titanium and antimony is obtained as follows, antimony having a melting point of 630° C.: An admixture of titanium and antimony powders in any desired proportions is initially heated at about 700° C. until a paste is formed. It is thereupon shaped and then heated at the higher temperature above mentioned until the shaped product has been transformed into a titanium-antimony alloy.

*Example 5.*—An alloy of tin and aluminum, in proportions of 50% each, has a melting point of 600° C. An admixture of this alloy with titanium powder is heated to, for example, 650° C., shaped at temperature as aforesaid, and thereupon heated at 1200–2000° F. until a shaped Ti-Sn-Al alloy is obtained.

*Example 6.*—An alloy consisting of 50% antimony and 50% tin melts at 425° C. This alloy in any desired ratio may be mixed in powder form with titanium powder and heated to about 450–500° C. to form a paste, which is thereupon shaped and subjected to high temperature heating as in Example 1 to give a finally shaped Ti-Sb-Sn alloy.

Similar products cannot be produced by conventional powder metallurgy techniques such as by pressing and sintering powdered admixtures of the constituents. Only relatively simple shapes can be produced in this manner, inasmuch as the dry powders cannot thus be forced into small cavities of intricate molds. Also unless special precautions are taken, such pressed and sintered admixtures do not result in true homogeneous alloys of the starting ingredients.

An alternative procedure to that above outlined for obtaining a paste consisting of the finely comminuted higher melting metal and the lower melting metal is to immerse the high melting powder in a molten bath of the lower melting metal and then remove the excess of the molten metal until the desired pasty consistency of the residue is obtained.

What is claimed is:

1. The process which comprises: admixing a higher melting metal, in a fine state of subdivision, with a lower melting metal and heating at a temperature slightly above the melting point of the latter until a pasty admixture is obtained, shaping the resulting admixture with pressure while at said temperature into a desired configuration, and thereupon holding said shaped pasty admixture at elevated temperature until said metals have interdiffused into a substantially homogeneous alloy.

2. The process which comprises: admixing a higher melting metal, in a fine state of subdivision, with a lower melting metal and heating at a temperature slightly above the melting point of the latter until a plastic paste is obtained, shaping the resulting paste with pressure while at said temperature into a desired configuration, and hereupon heating said shaped plastic paste at a higher temperature until said metals have interdiffused into a substantially homogeneous alloy.

3. The process which comprises: admixing a higher melting metal, in a fine state of subdivision, with a lower melting metal and heating at a temperature slightly above the melting point of the latter, until a pasty admixture is obtained, shaping said admixture with pressure while at said temperature into a desired configuration, and thereupon heating said shaped pasty admixture at about 1200–2000° F. until said metals have interdiffused into a substantially homogeneous alloy.

4. The process which comprises: admixing, in a fine state of subdivision, a metal selected from the group consisting of titanium, zirconium and alloys of each, with a lower melting metal and heating at a temperature slightly above the melting point of said lower melting metal until a pasty admixture is obtained, shaping the resulting paste with pressure while at said temperature into a desired configuration, and thereupon holding said shaped pasty admixture at elevated temperature until said metals have interdiffused into a substantially homogeneous alloy.

5. The process which comprises: admixing in a fine state of subdivision, a metal selected from the group consisting of titanium, zirconium and alloys of each, with a lower melting metal and heating at a temperature slightly above the melting point of said lower melting metal until a pasty admixture is obtained, shaping the resulting paste with pressure while at said temperature into a desired configuration, and thereupon heating said shaped pasty admixture at a temperature of about 1200–2000° F. for a period of about 1 to 10 hours, whereby said metals interdiffuse into a substantially homogeneous alloy.

6. The process which comprises: immersing a higher melting metal, in a fine state of subdivision, in a molten bath of a lower melting metal, removing the excess of said molten metal until a pasty admixture of said higher and lower melting metals is obtained, heating said admixture at a temperature slightly above the melting point of said lower melting metal and shaping the admixture with pressure into a desired configuration, and thereupon holding said shaped pasty admixture at elevated temperature until said metals have interdiffused into a substantially homogeneous alloy.

7. The process which comprises: immersing a higher melting metal, in a fine state of subdivision, in a molten bath of a lower melting metal, removing the excess of said molten metal until a pasty admixture of said higher and lower melting metals is obtained, heating said admixture at a temperature slightly above the melting point of said lower melting metal and shaping the admixture with pressure into a desired configuration, and thereupon heating said shaped pasty admixture at a substantially higher temperature until said metals have interdiffused into a substantially homogeneous alloy.

References Cited in the file of this patent

UNITED STATES PATENTS

| 2,097,502 | Southgate | Nov. 2, 1937 |
| 2,206,395 | Gertler | July 2, 1940 |
| 2,215,723 | Jones | Sept. 24, 1940 |
| 2,228,781 | Sauerwald | June 14, 1941 |
| 2,286,311 | Sauerwald | June 16, 1942 |
| 2,290,734 | Brassert | July 21, 1942 |
| 2,422,439 | Schwarzkopf | June 17, 1947 |
| 2,490,571 | Anicetti | Dec. 6, 1949 |

OTHER REFERENCES

Titanium—Report of Symposium, Dec. 16, 1948. Published by Office of Naval Research, Washington, D. C., March 1949, pages 27–29.